United States Patent [19]
Tsunefuji

[11] Patent Number: 5,111,232
[45] Date of Patent: May 5, 1992

[54] CAMERA HAVING FUZZY INFERENCE FUNCTION

[75] Inventor: Katsuhiko Tsunefuji, Sagamihara, Japan

[73] Assignee: Olympus Optical Co., Ltd., Tokyo, Japan

[21] Appl. No.: 532,916

[22] Filed: Jun. 4, 1990

[30] Foreign Application Priority Data

Jun. 15, 1989 [JP] Japan .................. 1-152922

[51] Int. Cl.$^5$ ............................................. G03B 13/00
[52] U.S. Cl. ................................. 354/402; 354/412; 354/145.1
[58] Field of Search ..................... 354/400–409, 354/432, 412, 413, 145.1, 149.1

[56] References Cited

U.S. PATENT DOCUMENTS 4,977,423 12/1990 Yamano et al. .................. 354/402

FOREIGN PATENT DOCUMENTS 60-11475   4/1985 Japan .
61-279829 12/1986 Japan .
62-39366   8/1987 Japan .
63-7330    2/1988 Japan .
63-7331    2/1988 Japan .
63-38119   2/1988 Japan .
63-113734  5/1988 Japan .
63-134922  6/1988 Japan .
63-134924  6/1988 Japan .

*Primary Examiner*—L. T. Hix
*Assistant Examiner*—David M. Gray
*Attorney, Agent, or Firm*—Frishauf, Holtz, Goodman & Woodward

[57] ABSTRACT

A camera includes a measuring circuit for outputting data about an object to be photographed. A fuzzy computer receives an output from the measuring circuit as an input value, obtains a fitting degree of the input value with respect to a then-part membership function from an if-part membership function and the then-part membership function, both of which correspond to a plurality of rules representing a degree of influence of the input value on an optimal exposure value, obtains a center of gravity value from a plurality of fitting degrees corresponding to the rules, and obtains a determination value as an inference result. A photographic condition is determined by both the determination value from the fuzzy computer and an output from the measuring circuit.

26 Claims, 13 Drawing Sheets

RULE (1)
$(X = A1, \quad Y = B1) \longrightarrow Z = C1$

RULE (2)
$(X = A2, \quad Y = B2) \longrightarrow Z = C2$

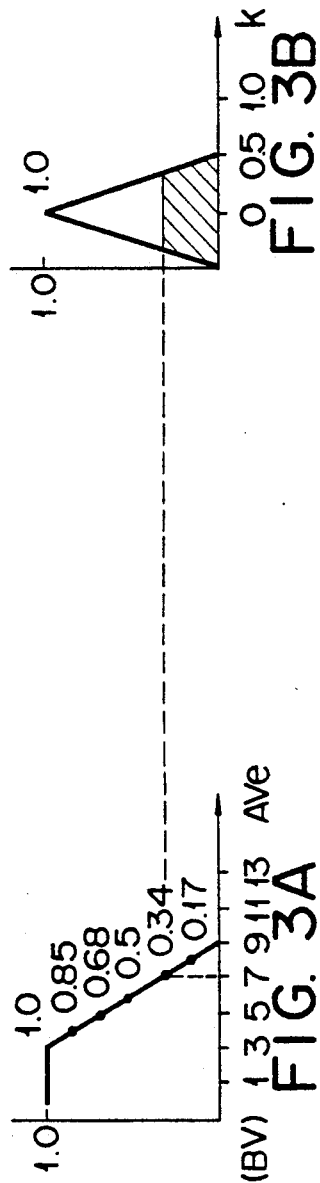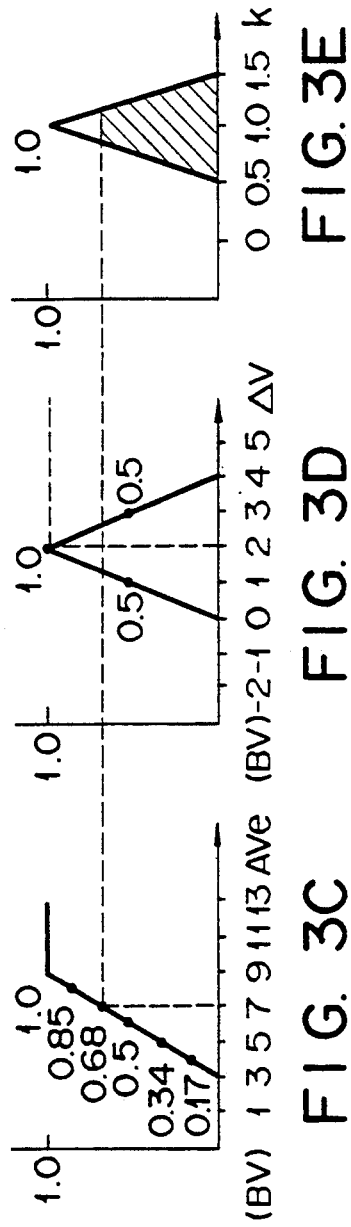

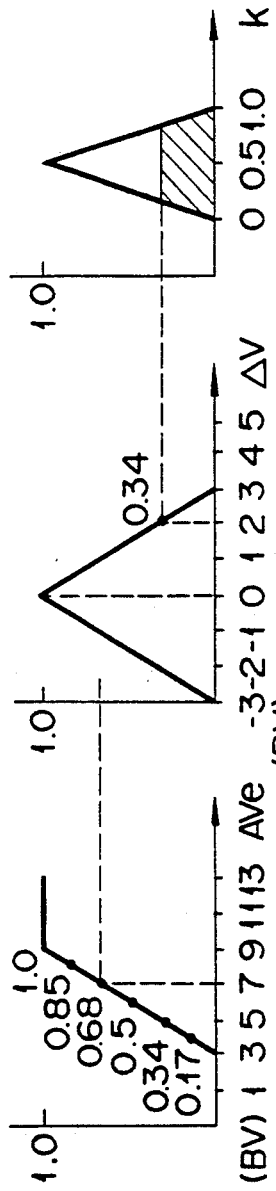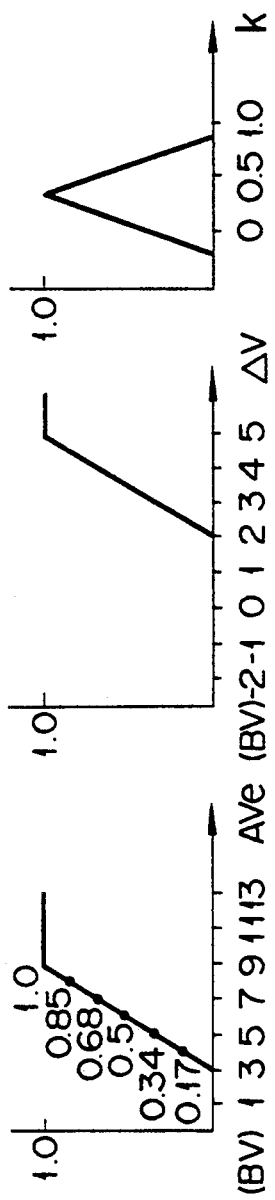

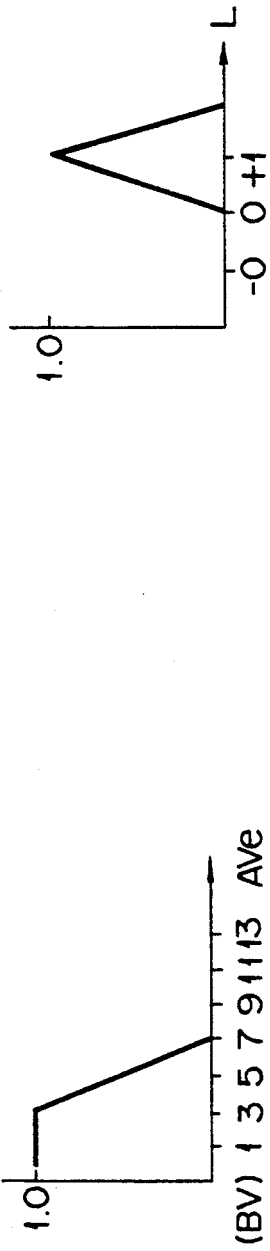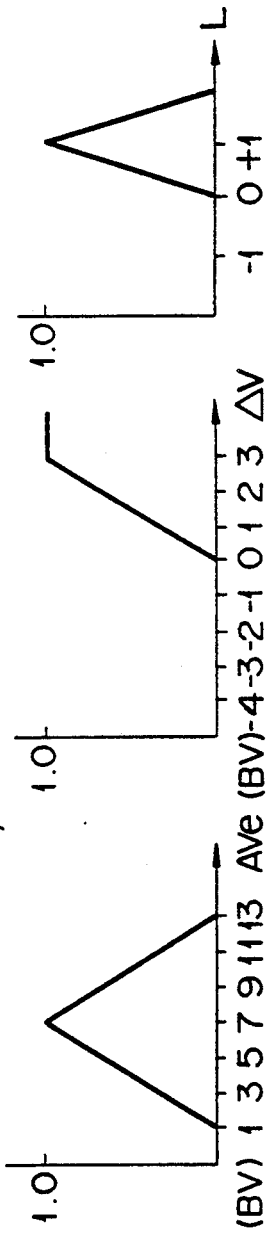

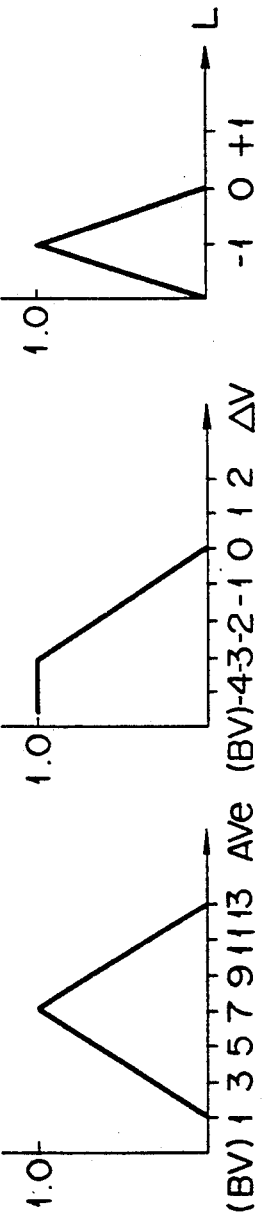
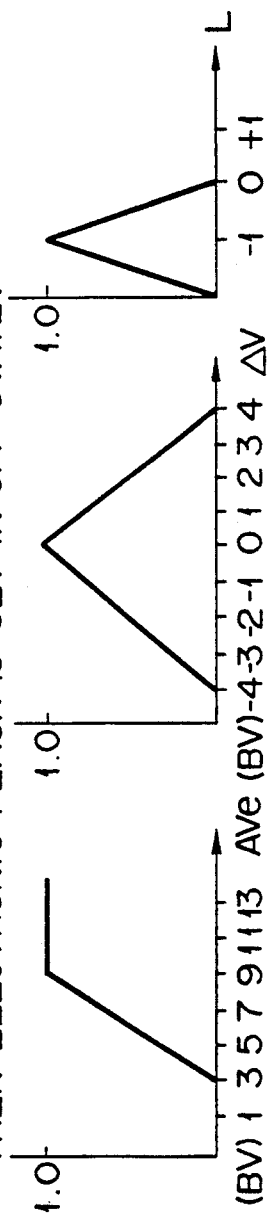

FIG. 8

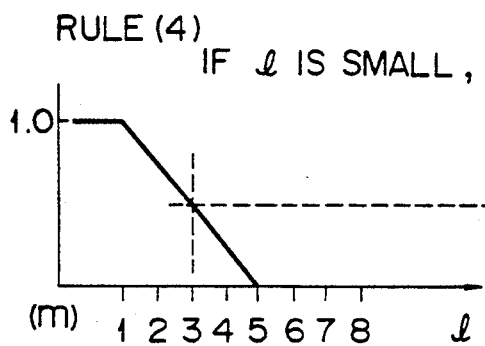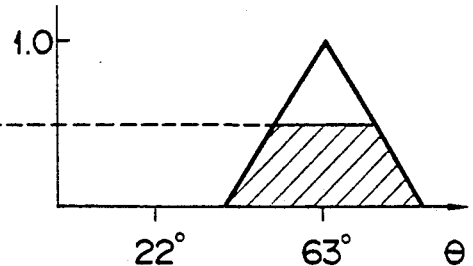
FIG. 9G          FIG. 9H
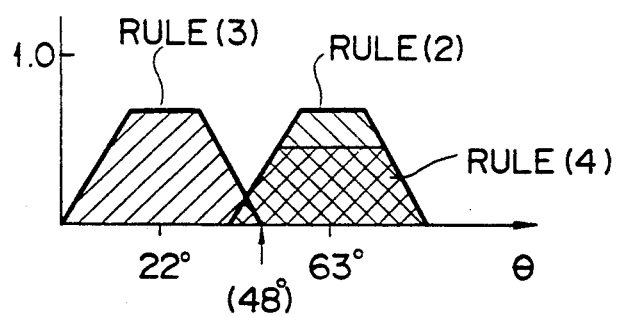
FIG. 10

LIGHT EMISSION ANGLE: SMALL

LIGHT EMISSION ANGLE: LARGE

CAMERA HAVING FUZZY INFERENCE FUNCTION

BACKGROUND OF THE INVENTION

1. Field of the Invention

The present invention relates to a camera for determining exposure conditions and performing electronic flash control on the basis of fuzzy rules defined by a fuzzy theory using information such as a brightness distribution state of an object to be photographed, an object distance, and a focal length of a lens used.

2. Description of the Related Art

Various conventional cameras using a formula for evaluating photometric results have been proposed wherein a brightness distribution state of an object to be photographed is measured by a plurality of photometric elements to determine an exposure value, as disclosed in Published Examined Japanese Utility Model Application No. 60-11475, Published Examined Japanese Patent Application Nos. 63-7331 and 62-39366, and Published Unexamined Japanese Patent Application Nos. 63-38119, 63-134922, and 63-134924.

In these conventional techniques, a determination value is used as a threshold value to perform classification and sorting with a formula so as to determine a back light state from a brightness distribution state of the object or an average or spot light measurement from the overall brightness. This threshold value and the classification are expressed in the form of values and formulas derived from actual experiences and knowledge. It is, however, very difficult to express the actual experiences and knowledge as digital values (crisp values).

When classification is performed based on many conditions such as the brightness distribution state of the object, the object distance, and the focal length of the lens, mathematical expressions are very complicated, and the number of classification items becomes large.

In addition, since a crisp value is used as a threshold value, a small increase from the crisp value causes a large increase in exposure value, thus resulting in an unnatural effect in practical photography. For this reason, in order to gradually change the exposure value, an interpolation operation is additionally performed, and the complicated operation is required.

SUMMARY OF THE INVENTION

It is therefore an object of the present invention to provide a camera which can determine an exposure value and perform electronic flash control on the basis of experiences and knowledge of a photographer in accordance with a small number of rules.

It is another object of the present invention to provide a camera having a simplified operation formula.

It is still another object of the present invention to provide a camera using a memory of a small capacity.

It is still another object of the present invention to provide a camera having a short operating time.

In order to achieve the above objects of the present invention, there is provided a camera comprising:

measuring means for outputting information associated with an object to be photographed; a fuzzy computer for receiving an output from the measuring means as an input value, obtaining a fitting degree of the input value with respect to a then-part membership function in accordance with an if-part membership function and the then-part membership function, both of which correspond to a plurality of rules representing a degree of influence of the input value on an optimal exposure, obtaining a center of gravity value from a plurality of fitting degrees corresponding to the rules, and obtaining a determination value as a result of inference; and means for determining a photographic condition from the determination value from the fuzzy computer and the output from the measuring means.

In the camera according to the present invention, photographic techniques derived from a wealth of experiences obtained at actual photographic scenes are formatted into rules expressed by verbal expressions of photographers. The rules are expressed by a membership function defined based on the fuzzy theory, and the degree of contribution of each rule to a given scene is expressed as a probability value. An optimal photographic method is inferred based on the fuzzy rules using the brightness distribution state of the object, the object distance, and the focal length of the photographic lens, thereby determining an exposure condition.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 3A to 3K are graphs showing fuzzy rules used for determining exposure conditions in the form of membership functions;

FIGS. 7A to 7K are graphs showing fuzzy rules used for determining an electronic flash automatic operation condition in the form of membership functions;

FIG. 8 is a table showing inference results obtained by the fuzzy rules shown in FIGS. 7A to 7K;

FIGS. 9A to 9H are graphs showing fuzzy rules used for determining an electronic flash light emission angle in the form of membership functions;

FIG. 10 is a graph showing a state wherein inference results obtained by the fuzzy rules in FIG. 9 are synthesized;

DETAILED DESCRIPTION OF THE PREFERRED EMBODIMENT

Prior to a description of a preferred embodiment of the present invention, general expressions by fuzzy rules defined on the basis of a fuzzy theory and a general inference method by fuzzy operations will be briefly described with reference to FIGS. 2A to 2G. Fuzzy rules (1) and (2) are defined as follows:

Rule (1): if X is A1 and Y is B1, then Z is C1.
Rule (2): if X is A2 and Y is B2, then Z is C2.

Figure 2A:
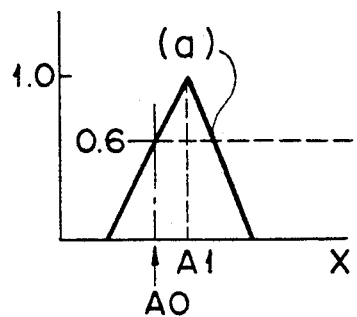
FIGS. 2A to 2G are graphs showing fuzzy rules in the form of membership functions.
Figure 2B:
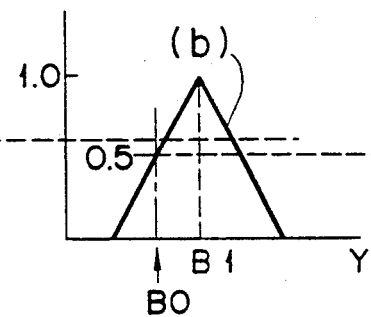
Figure 2C:
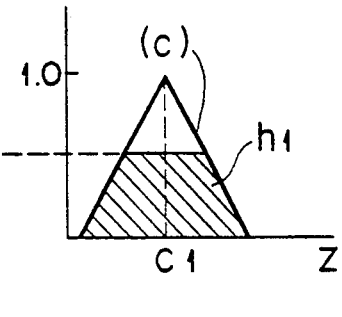
Figure 2D:
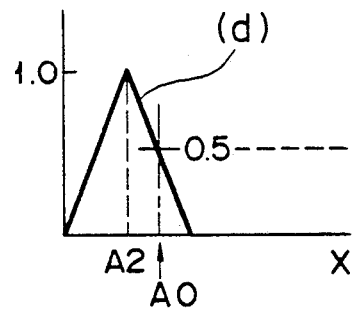
Figure 2E:
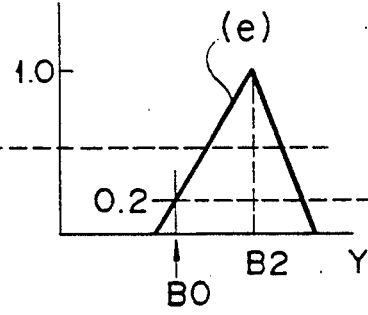
Figure 2F:
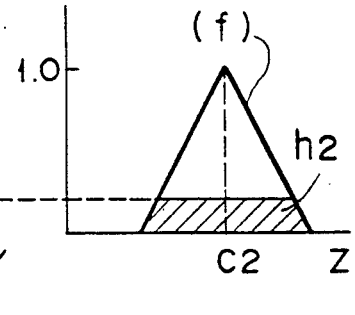

If X is A0 and Y is B0, then Z is inferred on the basis of the above rules. Rule (1) is expressed by if-part membership functions (a) and (b) and a then-part membership function (c), as shown in FIGS. 2A to 2C. Rule (2) is expressed by if-part membership functions (d) and (e) and a then-part membership function (f), as shown in FIGS. 2D to 2F. X, Y, and Z in these membership functions are plotted along the abscissas of the graphs, and a probability is plotted along the ordinates of the graphs. The case which is most suitable for the content of each rule is given as a probability "1.0".

If A0 and B0 are values shown in FIGS. 2A to 2G, a fitting degree of A0 in rule (1) is given as "0.6" in FIG. 2A, and a fitting degree of B0 in rule (1) is given as "0.5" in FIG. 2B. A condition for X and Y in rule (1) is an AND condition. If the minimum value is selected, i.e., "0.5" of B0 is selected, an inference value of Z, i.e., a fitting degree of the input value with respect to the then-part membership function can be represented by an area of a hatched portion h1 in FIG. 2C. A Z inference value can be represented by an area of a hatched portion h2 in FIG. 2F from the rule (2). These operations are called fuzzy operations.

Figure 2G:
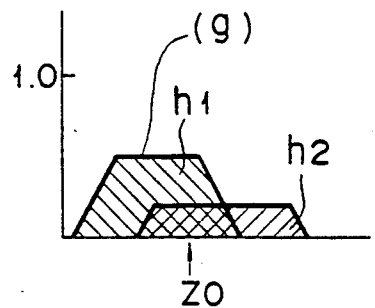

In order to obtain a final inference value (Z) from Rules (1) and (2), the graphs in FIGS. 2C and 2F are synthesized, and a center of gravity value Z0 is obtained from the areas represented by the hatched portions h1 and h2 (FIG. 2G). This determination value Z0 is a desired solution. A technique for obtaining a determination value from fuzzy operations by a center of gravity method is called a defuzzifier operation. To obtain a determination value from membership functions in techniques including a defuzzifier operation may be called fuzzy operations in a broad sense. These fuzzy operations are disclosed in U.S. Ser. No. 426,576 (title: DIGITAL FUZZY INFERENCE SYSTEM) filed Oct. 24, 1989 by the present applicant.

A preferred embodiment of the present invention will be described with reference to the accompanying drawings.

Figure 1:
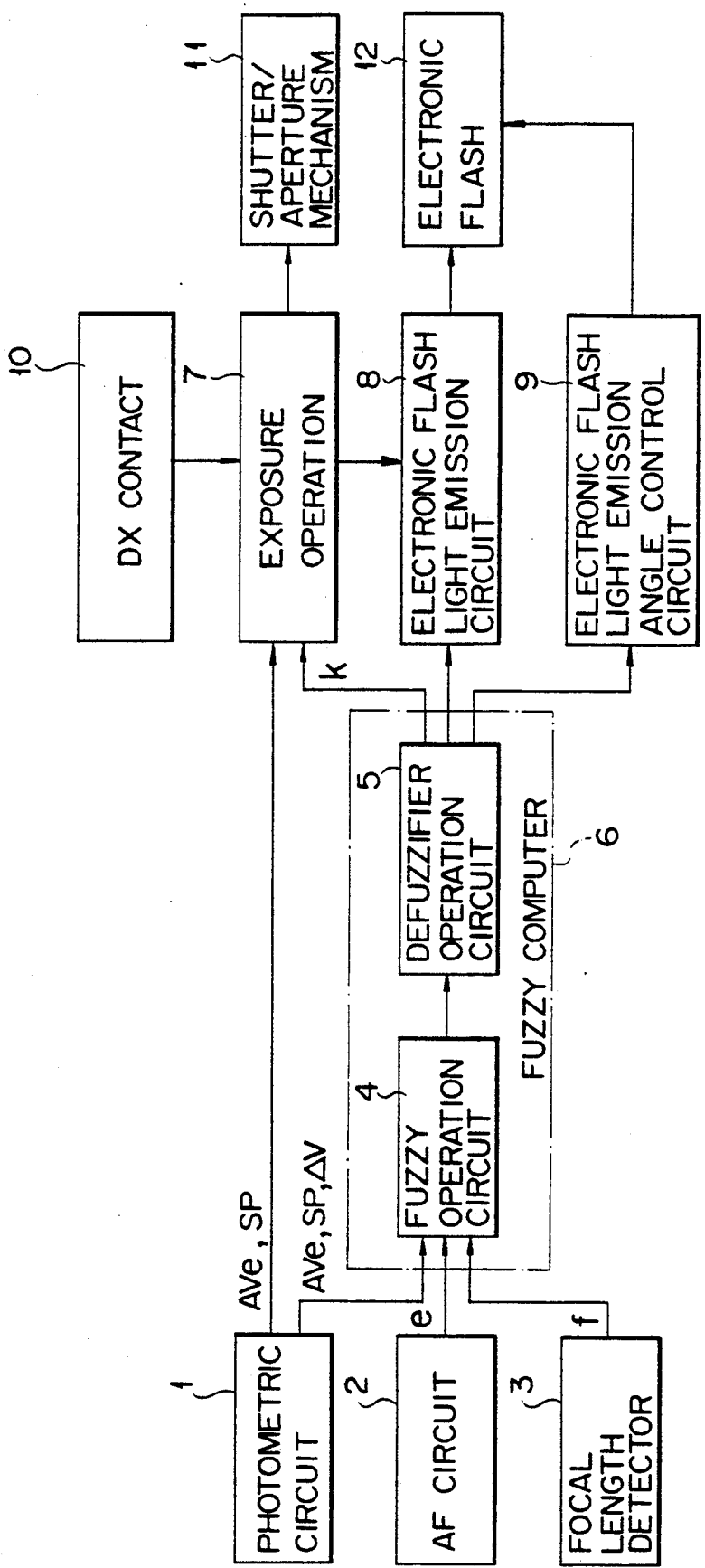
FIG. 1 is a block diagram showing a camera for performing shutter control, aperture control, and electronic flash control by a fuzzy theory according to the present invention.

FIG. 1 is a block diagram showing a camera for performing shutter/aperture control and electronic shutter control according to the fuzzy inference. More specifically, reference numeral 1 denotes a photometric circuit (photometric means having photometric elements (photoelectric conversion elements) for measuring a brightness distribution of an object to be photographed. An object field is divided into a plurality of parts by the photometric elements, and light measurement for at least central and peripheral portions of the object can be performed. Reference numeral 2 denotes an AF (autofocus) circuit (distance measuring means) for measuring a distance to the object and generating a distance signal representing a distance to the object. Reference numeral 3 denotes a focal length detector (focal length detecting means) for detecting a focal length of a photographic lens in synchronism with zooming and generating a focal length signal representing a focal length of the photographic lens.

Figure 11:
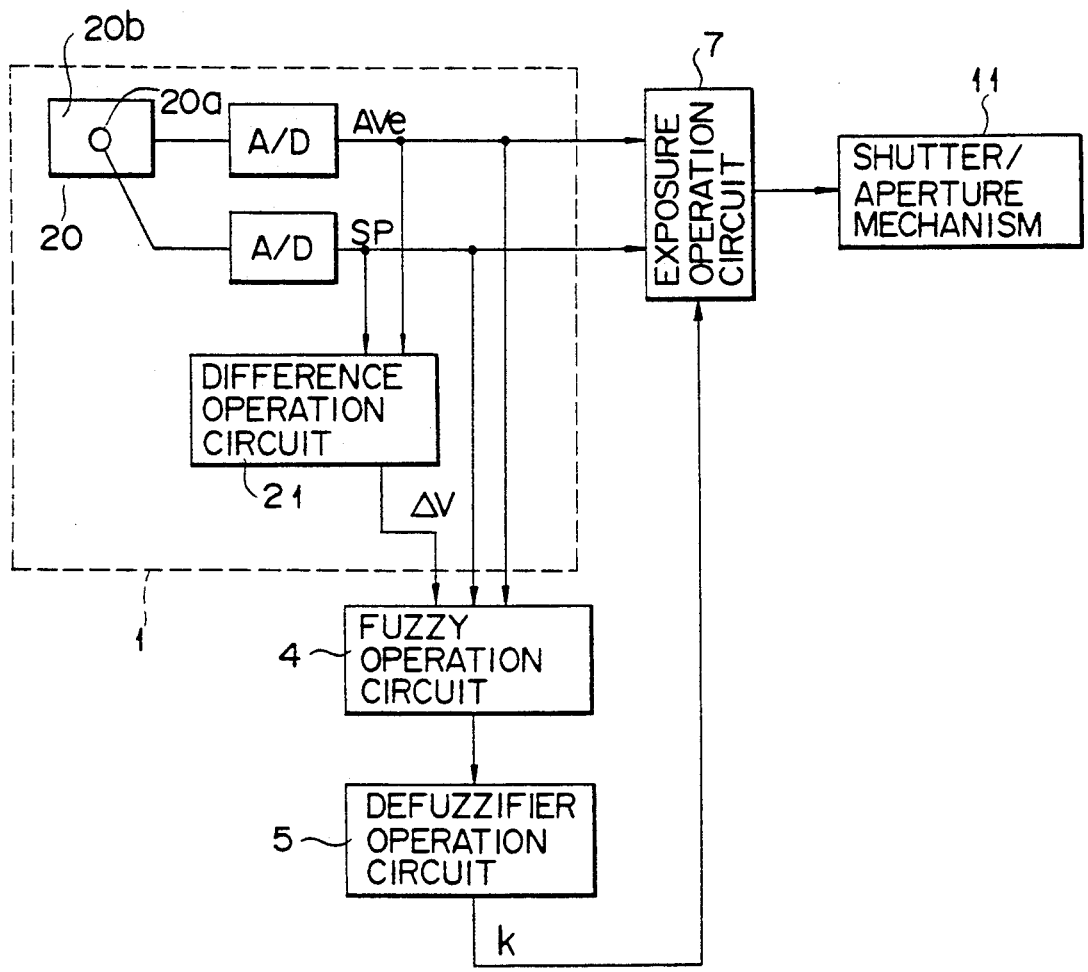
FIG. 11 is a block diagram showing a detailed circuit arrangement of a photometric circuit.

The photometric circuit 1 is illustrated in detail in FIG. 11. More specifically, each photometric element 20 comprises a spot photometric light-receiving element 20a for measuring light at only the central portion of an object image and an average photometric light-receiving element 20b for measuring light on the entire object image. Outputs from the light-receiving elements 20a and 20b are output as a spot photometric value Sp and an average photometric value AVe through A/D converters, respectively. A difference operation circuit 21 generates a difference between the photometric values AVe and Sp as an output ΔV. In this case, the average photometric value AVe may be derived from only the out put from the average photometric light-receiving element 20b or a sum of the outputs from the both the average photometric light-receiving element 20b and the spot photometric light-receiving element 20a. In this embodiment, the former output is used.

Outputs from the photometric circuit 1, the AF circuit 2, and the focal length detector 3 are input to a fuzzy operation circuit 4. The fuzzy operation circuit 4 performs fuzzy operations in accordance with predetermined rules. These predetermined rules are defined as clear verbal expressions as photographic techniques for actual photographic scenes. Fitting degrees corresponding to the respective rules are calculated by the fuzzy operations, and an inference value of a photographic scene is calculated as a value as a degree of certainty. Fuzzy operation values from the respective rules are synthesized by a defuzzifier operation circuit 5, and an inference result is calculated as a determination value according to a center of gravity method.

The fuzzy operation circuit 4 and the defuzzifier operation circuit 5 constitute a fuzzy computer 6. In the fuzzy computer 6, an inference value is obtained from an input value by the rules based on the fuzzy theory, and the inference value is calculated as a determination value.

An inference result from the fuzzy computer 6 is input to an exposure operation circuit (exposure determining means) 7, an electronic flash light emission circuit (electronic flash light emission control means) 8, and an electronic flash light emission angle control circuit (electronic flash light emission angle control means) 9. The exposure operation circuit 7 receives object brightness data from the photometric circuit 1 and film sensitivity data read by a DX contact 10 and calculates exposure conditions such as a degree of center of gravity in accordance with the inference result from the fuzzy computer 6. The exposure operation circuit 7 controls a shutter/aperture mechanism 11 on the basis of the calculated exposure conditions.

The electronic flash light emission circuit 8 causes an electronic flash 12 to emit light in accordance with a light emission signal from the fuzzy computer 6 and a light emission amount signal from the exposure operation circuit 7.

Figure 13A:
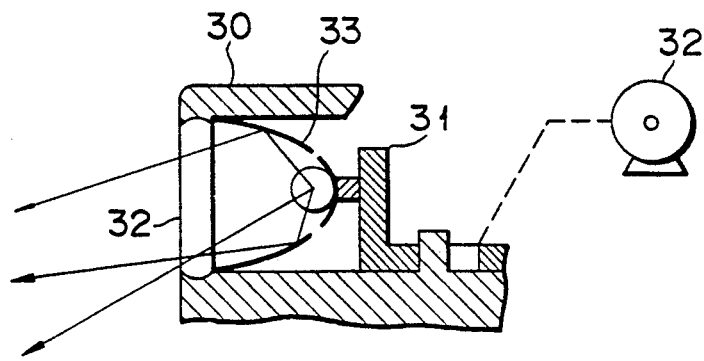
FIGS. 13A and 13B are sectional views showing a method of setting and controlling an electronic flash light emission angle.
Figure 13B:
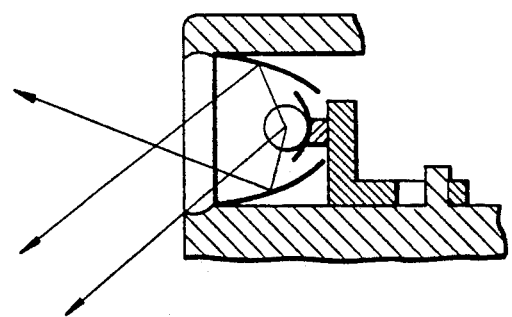

The electronic flash light emission angle control circuit 9 sets and controls a light emission angle of the electronic flash 12 on the basis of light emission angle data from the fuzzy computer 6. Various types of means are known as means for setting and controlling the light emission angle. For example, as shown in FIGS. 13A and 13B, a discharge tube mounting base 31 is slidably mounted on an electronic flash unit 30, and the mounting base 31 is reciprocated by a motor 32 driven by an output from the control circuit 9. Reference numeral 33 denotes a reflecting mirror. The reflecting mirror 33 may be reciprocated, or any proper technique may be employed to achieve the above operation.

The rules will be described in detail below. A technique for determining exposure conditions will be described first. By using the photometric elements for measuring light at the central portion (spot light measurement) and the peripheral portion (average light measurement) of the object, an object condition is inferred in accordance with a brightness distribution state of the object and its entire brightness, and a degree of center of gravity is determined.

For example, if brightness of the object by spot light measurement is defined as SP, and brightness of the object by average light measurement is defined as AVe, object brightness BV for determining an exposure value is calculated as follows:

$$BV = k.SP + (1-k).AVe$$

The difference $\Delta V$ between the spot photometric value SP and the average photometric value AVe is defined as follows:

$$\Delta V = AVe - SP$$

A value k in the above equation is determined by fuzzy inference, and degrees of center of gravity in spot and average light measurements are changed.

Rule (1): When an object image is dark as a whole (average photometric value), an object scene area having a high contrast level is small, and exposure is performed using the average photometric value ($k=0$).

Rule (2): When an object image is bright as a whole, the spot photometric value represents a brightness level darker than that represented by the average photometric value, and when a difference between the average and spot photometric values is an intermediate value, an object state is detected as a back light state, thereby exposing the object image with the spot photometric value ($k=1.0$).

Rule (3): When an object image is bright as a whole and a difference between the average and spot photometric values is small, the object image is exposed with an average value ($k=0.5$) of the average and spot photometric values.

Rule (4): When an object image is bright as a whole and the spot photometric value represents a very dark level, the object is often a black object having a small reflectance unlike in the back light state. In this case, exposure is concentrated on a shadow portion, and a value ($k=0.3$) close to the average photometric value is used to expose the object.

The above rules are obtained by expressing photographic techniques based on actual photographic scenes in the form of verbal expressions. These rules are described as fuzzy rules as follows:

Rule (1): If AVe represents a dark state, k is set to "0".

Rule (2): If AVe represents a bright state and $\Delta V$ is an intermediate positive value, k is set to "1.0".

Rule (3): If AVe represents a bright state and $\Delta V$ is small, k is set to "0.5".

Rule (4): If AVe represents a bright state and $\Delta V$ is a very large positive value, k is set to "0.3".

The above rules are expressed as membership functions, as shown in FIGS. 3A to 3K. In Rule (1), the dark state represented by AVe is expressed by a BVe value of the average photometric value plotted along the abscissa, and the degree of coincidence is plotted along the ordinate. In this case, the concept of the dark state perfectly (100%) coincides with 1.0 up to BV3. The concept of the dark state for BV6 is expressed as 0.5, i.e., the degree of coincidence is 50%. The concept of the dark state for BV9 is given by "0", i.e., there is no concept of darkness.

Rules (1) to (4) can be represented by the membership functions as described above. Fuzzy operations are performed based on these membership functions, as shown in FIGS. 2A to 2G, thereby obtaining values of the coefficient k.

Figure 4:
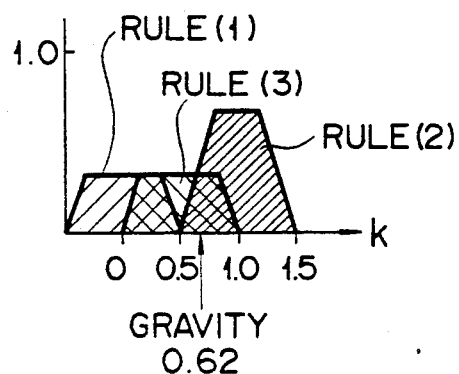
FIG. 4 is a graph showing a state wherein inference results obtained by the fuzzy rules shown in FIGS. 3A to 3K are synthesized.

Assume an object having an AVe value of 7 (BV) and an SP value of 5 (BV) in a slight back light state. $AVe=7$ (BV), $SP=5$ (BV), and $V=+2$ (BV) are substituted in FIGS. 3A to 3K. A probability for $k=0$ is 0.34 from Rule (1), a probability for $k=1.0$ is 0.68 from Rule (2), a probability for $k=0.5$ is 0.33 from Rule (3), and a probability for $k=0.3$ is zero from Rule (4). These probabilities are synthesized, as shown in FIG. 4, and their center of gravity is given as $k=0.62$. Therefore, this object is photographed under the condition that $BV = 0.62SP + 0.38AVe$.

Figure 5:
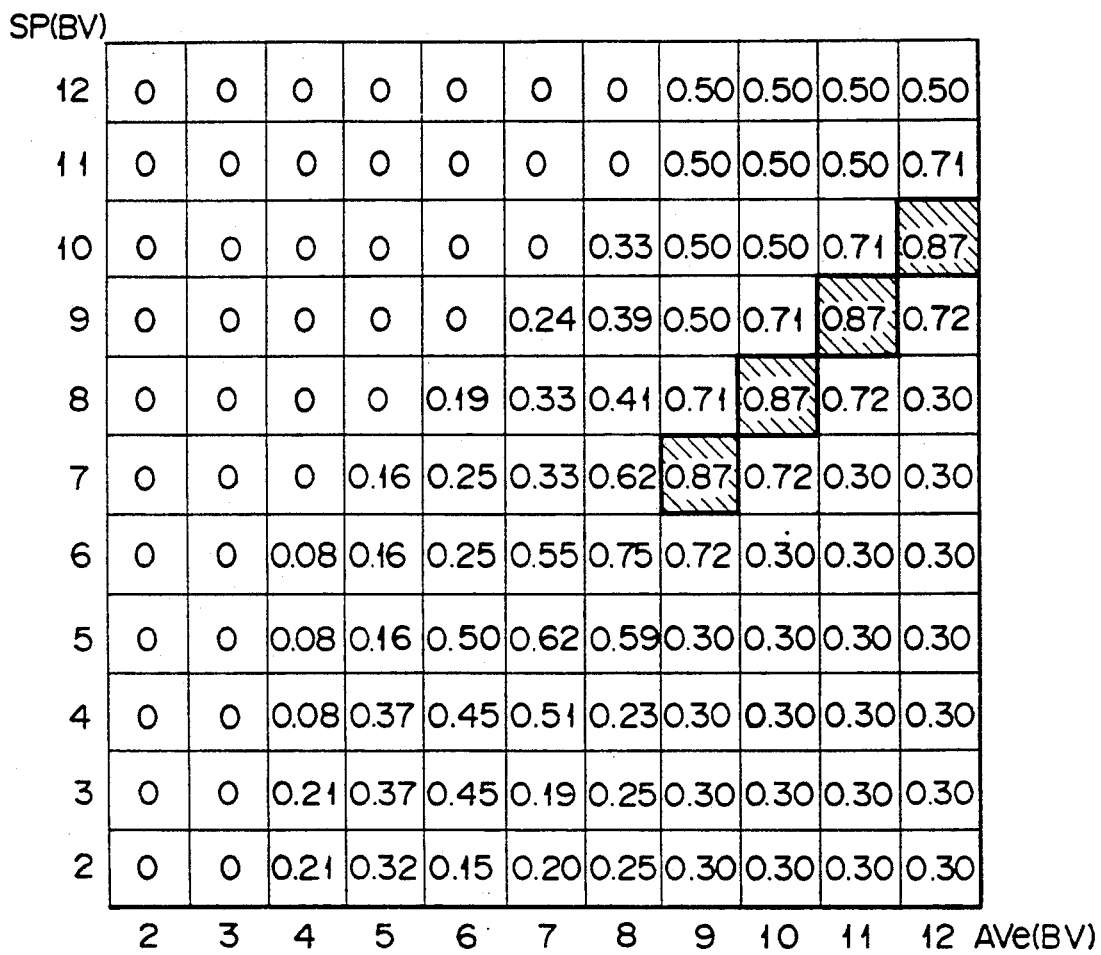
FIG. 5 is a table showing values of a coefficient k on the basis of interference using combinations of AVe and SP values.
Figure 9A:
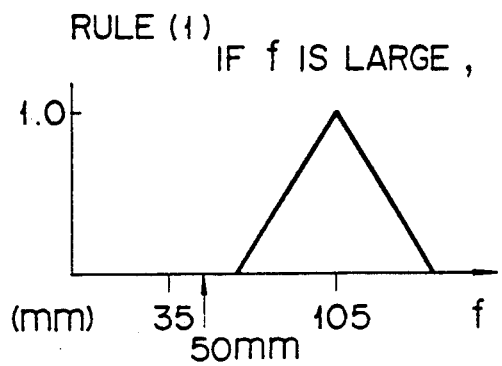
Figure 9B:
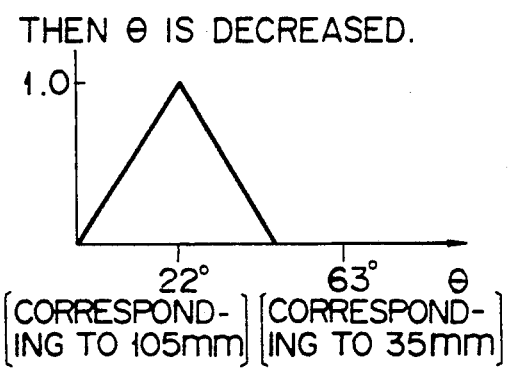
Figure 9C:
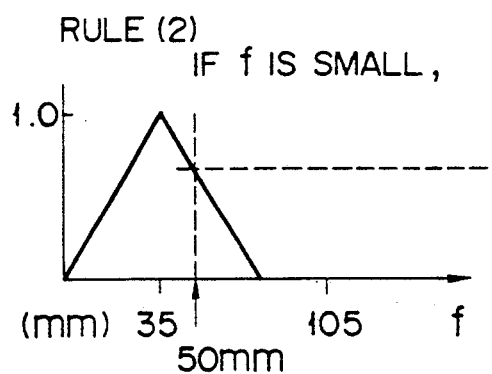
Figure 9D:
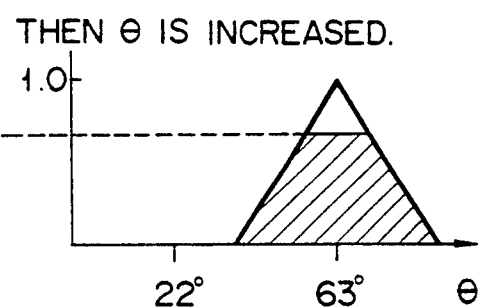
Figure 9E:
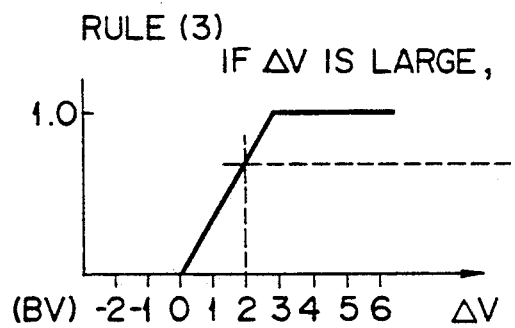
Figure 9F:
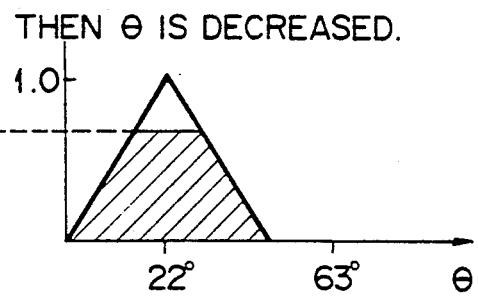

The values of the coefficient k based on inference using combinations of the AVe and SP values are summarized in FIG. 5. Hatched portions in FIG. 5 represent $k=0.87$, which indicates the light measurement at the center of gravity. All the above inference steps are obtained from the four rules described above. In order to further improve or change this inference result, the rules or membership functions are changed.

As described above, experiences are described by fuzzy rules, and inference is performed by fuzzy operations, so that all scenes can be inferred by several rules. In addition, when the inference result is not satisfied, the rules or membership functions are changed. These changes are understandable to photographers. When photographic conditions are expressed by mathematical expressions, they are changed by changing numeric values or mathematical expressions in conventional techniques. In this case, it is difficult for a photographer to change the numeric values and the mathematical expressions in correspondence with actual photographic scenes. To the contrary, by the description and inference using the rules based on the fuzzy theory, an ordinary photographer can cause the camera to easily perform automatic control, resulting in convenience.

A fuzzy technique for inferring a degree of center of gravity by object distance data to improve the result shown in FIG. 5 will be described below. In general, when a far object is given, it need not be assumed to be set in a back light state. This experience can provide the following rule.

Rule (5): When an object distance l is large, $k=0$.

Figure 6A:
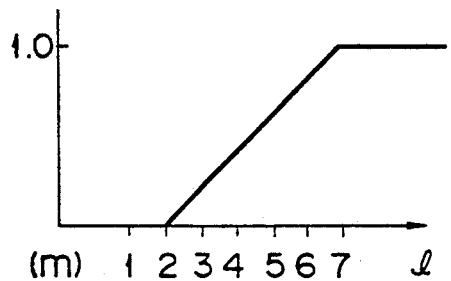
FIGS. 6A and 6B are graphs showing fuzzy rules for improving the results of FIG. 5 in the form of membership functions.
Figure 6B:
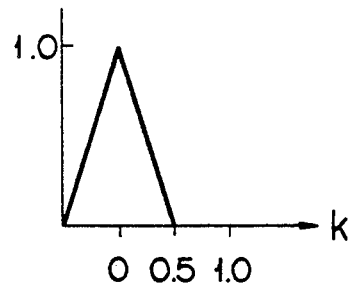

In this case, membership functions are shown in FIGS. 6A and 6B. When an inference result from Rule (5) is added to the table in FIG. 5, a further elaborated inference using distance data as a parameter can be performed. In this manner, by using the fuzzy inference, a complicated inference can be simplified.

A rule for determining an electronic flash automatic light emission condition, i e., automatic light emission control of the electronic flash 12 on the basis of determination of a back light or dark state of an object, will be described below. If brightness of an object by spot light measurement is defined as SP and brightness of the object by average light measurement is defined as AVe, a difference ΔV between these two brightness values SP and AVe is given by ΔV=AVe−SP.

In order to operate the electronic flash 12 in a dark state,

Rule (1): If AVe represents a dark state, the electronic flash 12 is set in an ON state (light emission enable state).

In order to operate the electronic flash 12 in a back light state,

Rule (2): If AVe represents an intermediate brightness level and the difference ΔV is a large positive value, the electronic flash 12 is set in the ON state.

In order to disable the operation of the electronic flash 12 since the brightness level is a normal level and the SP value represents a bright state, Rule (3): If AVe represents an intermediate brightness level and the difference ΔV is a large negative value, the electronic flash 12 is set in an OFF (light emission inhibition state).

In order to inhibit light emission from the electronic flash 12 to provide priority to spot light measurement over average light measurement when an object is set in a very bright but slight back light state (i.e., the range corresponding to the hatched portions in FIG. 5), Rule (4): If AVe represents a very bright state and the difference ΔV is small, the electronic flash 12 is set in an OFF state.

Figure 8:
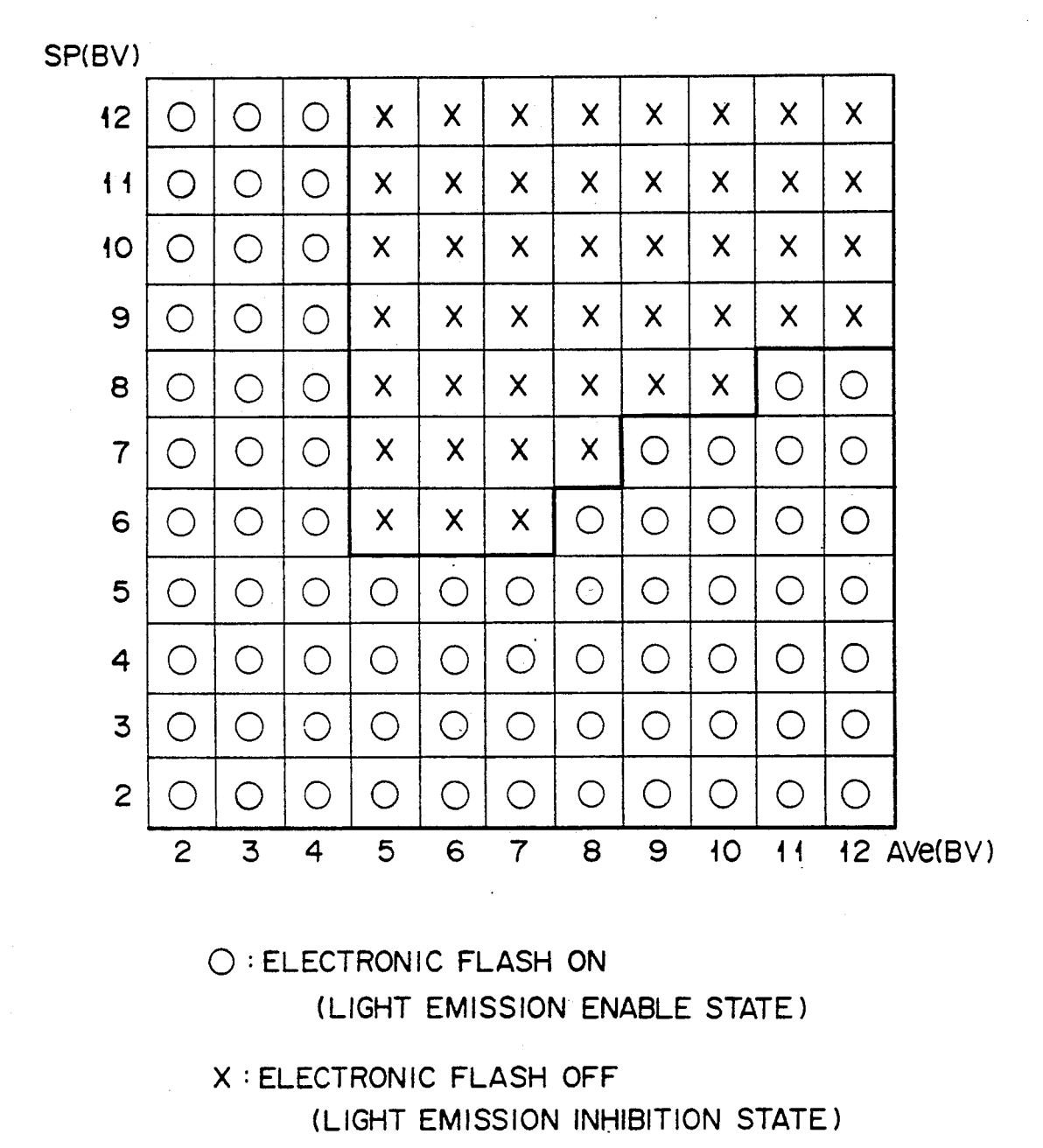

These rules are expressed by membership functions, as shown in FIGS. 7A to 7K. As in the above embodiment, inference results derived from these rules are summarized in a table shown in FIG. 8. These results are combined with determination of exposure values of the above embodiment to obtain complicated combinations of exposure values. A technique for determining an electronic flash light emission angle will be described below. In a conventional camera with a zoom lens, the light emission angle of the electronic flash is determined by only the focal length of the photographic lens, i.e., the zoom lens used. For example, when the zoom lens is used in a telephoto mode, the electronic flash light emission angle is reduced. However, when the zoom lens is used in a wide-angle mode, the electronic flash light emission angle is increased.

In an actual photographic operation, the light emission angle of the electronic flash must be determined in consideration of the object distance and the back light state of the object to obtain a better result. For example, as for a portrait picture, the central portion of the photographic scene must be mainly irradiated with light from the electronic flash. In this case, the light emission angle can be small. Even in a telephoto mode, the light emission angle is set to be large for a near object to obtain a uniform lighting effect because a light amount is sufficient. These photographic experiences are described by fuzzy rules to infer an optimal light emission angle of the electronic flash.

If brightness of an object by spot light measurement is defined as SP and brightness of the object by average light measurement is defined as AVe, a difference ΔV between the brightness values SP and AVe is defined as ΔV=AVe−SP. In addition, an object distance, a focal length of a photographic lens, and a focal length are defined as l, f, and 35 mm to 105 mm, respectively. A determined light emission angle of the electronic flash is defined as θ, which is defined with respect to a diagonal line of an image screen corresponding to the focal length of the photographic lens.

Rule (1): If the focal length f is large, the angle θ is decreased.

Rule (2): If the focal length f is small, the angle θ is increased.

Rule (3): If the object is set in a back light state (i.e., the difference ΔV is large), the angle θ is decreased.

Rule (4): If the object is a near object (the object distance l is small), the angle θ is decreased.

These rules are expressed by membership functions, as shown in FIGS. 9A to 9H. For example, if f=50 mm, ΔV=2 (BV), and l=3 m, then an inference result is θ=48° from FIGS. 9A to 9H and 10. This angle corresponds to about f=44 mm.

As described above, various rules are stored in the fuzzy computer 6 in the block diagram of FIG. 1, and photometric data, the object distance data, the lens focal length data are input to infer an object condition. As described with reference to the embodiment, the exposure condition, the electronic flash light emission condition, and the electronic flash light emission angle are determined by only 13 rules. In addition, these rules can be easily understood by an ordinary user.

The inference and arithmetic operations of a conventional camera using mathematical expressions and arithmetic operations based on these expressions to determine an exposure value and control ON/OFF operations of the electronic flash are unknown to ordinary users. However, these operations can be simply represented by a description of rules based on the fuzzy theory as described above. In addition, an inference result can be easily obtained as a determination value from the rules in accordance with fuzzy operations.

There have been proposed a fuzzy digital computer system for defining membership functions and performing fuzzy arithmetic operations by software, a fuzzy analog computer system for processing definition values of the membership functions as analog voltage values and causing analog circuits to obtain maximum and minimum voltage values, and a ROM storage type fuzzy computer for storing fuzzy operation results (FIGS. 5 and 8) in tables in a ROM and obtaining values from the tables in response to input values. The present invention is applicable to all these fuzzy computer systems.

Figure 12A:
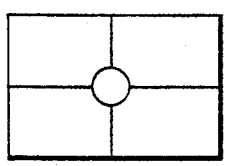
FIGS. 12A to 12C are views showing other arrangements of photometric elements.
Figure 12B:
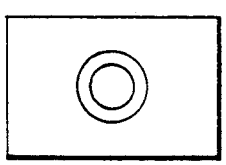
Figure 12C:
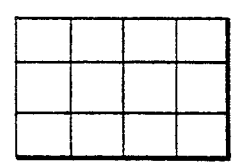

The arrangement of the photometric element is not limited to the one shown in FIG. 11. Arrangements each having divided areas may be used, as shown in FIGS. 12A, 12B, and 12C. New rules may be produced in accordance with division patterns.

As has been described above, according to the camera of the present invention, experiences are substituted by fuzzy rules, and the fuzzy theory is practiced to calculate exposure values (i.e., to determine weighting of spot and average photometric values), to enable/inhibit light emission of the electronic flash, and to determine the light emission angle of the electronic flash. Therefore, determination of exposure values derived from experiences of photographers and electronic flash control can be performed by using a small number of rules. The operation expressions can be simplified, the memory capacity can be greatly reduced, and the operating time can be greatly shortened. Various other effects can be expected.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A camera comprising:
   measuring means for outputting information associated with an object to be photographed;
   a fuzzy computer for receiving an output from the measuring means as an input value, obtaining a fitting degree of the input value with respect to a then-part membership function in accordance with an if-part membership function and the then-part membership function, both of which correspond to a plurality of rules representing a degree of influence of the input value on an optimal exposure, obtaining a center of gravity value from a plurality of fitting degree corresponding to the rules, and obtaining a determination value as a result of inference; and
   means for determining photographic conditions from the determination value from the fuzzy computer and the output from said measuring means.

2. A camera according to claim 1, wherein said measuring means includes photometric means for outputting a plurality of object brightness signals including a signal representing a brightness level of at least a central portion of the object.

3. A camera according to claim 2, wherein said measuring means further includes distance measuring means for outputting distance data of the object.

4. A camera according to claim 1, wherein the photographic conditions include an exposure value and data representing a light emission enable/disable state of an electronic flash.

5. An exposure value operation apparatus for a camera, comprising:
   photometric means for outputting a plurality of object brightness signals including a signal representing a brightness level of at least a central portion of an object;
   a fuzzy computer for receiving an output from said photometric means as an input value, obtaining a fitting degree of the input value with respect to a then-part membership function from an if-part membership function and the then-part membership function, both of which correspond to a plurality of rules representing a degree of influence of the input value on an exposure state, obtaining a center of gravity value from a plurality of fitting degrees corresponding to the rules, and obtaining a determination value as an inference result; and
   operating means for determining weighting of the brightness signal from said photometric means to obtain an exposure value in accordance with the determination value from said fuzzy computer.

6. An exposure value operation apparatus for a camera, comprising:
   photometric means for outputting a plurality of object brightness signals including a signal representing a brightness level of at least a central portion of an object;
   distance measuring means for outputting distance data of the object;
   a fuzzy computer for receiving outputs from said distance measuring means and said photometric means as input values, obtaining a fitting degree of the input values with respect to a then-part membership function from an if-part membership function and the then-part membership function, both of which correspond to a plurality of rules representing a degree of influence of the input values on an exposure state, obtaining a center of gravity value from a plurality of fitting degrees corresponding to the rules, and obtaining a determination value as an inference result; and
   operating means for determining weighting of the brightness signal from said photometric means to obtain the exposure value in accordance with the determination value from said fuzzy computer.

7. An electronic flash control apparatus for a camera, comprising:
   photometric means for outputting a plurality of object brightness signals including a signal representing a brightness level of at least a central portion of an object;
   a fuzzy computer for receiving an output from said photometric means as an input value, obtaining a fitting degree of the input value with respect to a then part membership function from an if-part membership function and the then-part membership function, both of which correspond to a plurality of rules representing a degree of influence of the input value on electronic flash control, obtaining a center of gravity value from a plurality of fitting degrees corresponding to the rules, and obtaining a determination value as an inference result; and
   electronic flash control means for controlling a light emission enable/disable state of an electronic flash by the determination value from said fuzzy computer.

8. An electronic flash control apparatus for a camera, comprising:
   photometric means for outputting a plurality of object brightness signals including a signal representing a brightness level of at least a central portion of an object;
   distance measuring means for outputting distance data of the object;
   output means for outputting focal length data of a photographic lens;
   a fuzzy computer for receiving outputs from said output means, said photometric means, and said distance measuring means as input values, obtaining a fitting degree of the input values with respect to a then-part membership function from an if-part membership function and the then-part membership function, both of which correspond to a plurality of rules representing a degree of influence of the input values on a light emission angle of an electronic flash, obtaining a center of gravity value from plurality of fitting degrees corresponding to the rules, and obtaining a determination value as an inference result; and
   electronic flash light emission angle control means for controlling the light emission angle of said electronic flash in accordance with the determination value from said fuzzy computer.

9. An electronic flash control apparatus for a camera, comprising:
   photometric means for outputting a plurality of object brightness signals including a signal representing a brightness level of at least a central portion of an object;

output means for outputting focal length data of a photographic lens;

a fuzzy computer for receiving outputs from said output means and said photometric means as input values, obtaining a fitting degree of the input values with respect to a then-part membership function from an if-part membership function and the then-part membership function, both of which correspond to a plurality of rules representing a degree of influence of the input values on a light emission angle of an electronic flash, obtaining a center of gravity value from a plurality of fitting degrees corresponding to the rules, and obtaining a determination value as an inference result; and electronic flash emission angle control means for controlling the light emission angle of said electronic flash in accordance with the determination value from said fuzzy computer.

10. An exposure determining apparatus for a camera having means for measuring a brightness distribution of an object, comprising:

a fuzzy computer for obtaining fitness degrees against exposure conditions represented as a plurality of membership functions in accordance with input values corresponding to brightness distribution states of an object and outputting as a determination value an inference result determined by operations for obtaining a center of gravity value from said plurality of fitness degrees;

control means for determining an exposing condition on the basis of the determination value; and a control target object driven by an output from said control means.

11. An apparatus according to claim 10, wherein said control means includes at least one of an exposure value operation circuit, an electronic flash light emission enable/disable control circuit, and an electronic flash light emission angle control circuit.

12. An apparatus according to claim 10, wherein the target object includes at least one of a shutter, an aperture, and an electronic flash.

13. A camera comprising:

measuring means for outputting information associated with an object to be photographed;

a fuzzy operation circuit for receiving an output from the measuring means as an input value, obtaining a fitting degree of the input value with respect to a then-part membership function in accordance with an if-part membership function and the then-part membership function, both of which correspond to a plurality of rules representing a degree of influence of the input value on an optimal exposure;

a defuzzifier operation circuit for obtaining a determination value as a result of inference in correspondence with a center of gravity value obtained from said fitting degree; and means for determining photographic conditions from the determination value from the defuzzifier operation circuit and the output from the measuring means.

14. A camera according to claim 13, wherein the if-part membership function is a function in which an axis of abscissa corresponds to the output from the measuring means and an axis of ordinate corresponds to the degree of influence from 0 to 1, and the then-part membership function is a function in which the axis of abscissa corresponds to a correction value, and the axis of ordinate corresponds to the degree of influence from 0 to 1.

15. An exposure value operation apparatus for a camera, comprising:

photometric means for outputting a plurality of object brightness signals including a signal representing a brightness level of at least a central portion of an object;

a fuzzy operation circuit for receiving an output from the photometric means as an input value, obtaining a fitting degree of the input value with respect to a then-part membership function from an if-part membership function and the then-part membership function, both of which correspond to a plurality of rules representing a degree of influence of the input value on an exposure state;

a defuzzifier operation circuit for obtaining a center of gravity value from a plurality of fitting degrees corresponding to the rules, and obtaining a determination value as an inference result; and operating means for determining weighting of the brightness signal from said photometric means to obtain an exposure value in accordance with the determination value from the defuzzifier operation circuit.

16. An exposure value operation apparatus for a camera, comprising:

photometric means for outputting a plurality of object brightness level of at least a central portion of an object;

distance measuring means for outputting distance data of the object;

a fuzzy operation circuit for receiving an output from the distance measuring means and the photometric means as input values, obtaining a fitting degree of the input values with respect to a then-part membership function from an if-part membership function and the then-part membership function, both of which correspond to a plurality of rules representing a degree of influence of the input values on an exposure state;

a defuzzifier operation circuit for obtaining a center of gravity value in correspondence with an output from the fuzzy operation circuit, and obtaining a determination value as an inference result; and operating means for determining weighting of the brightness signal from said photometric means to obtain an exposure value in accordance with the determination value from the defuzzifier operation circuit.

17. An exposure value operation apparatus for a camera, comprising:

photometric means for outputting a plurality of object brightness signals including a signal representing a brightness level of at least a central portion of an object;

a fuzzy operation circuit for receiving an output from the photometric means as an input value, obtaining a fitting degree of the input value with respect to a then-part membership function from an if-part membership function and the then-part membership function, both of which correspond to a plurality of rules representing a degree of influence of the input value on electronic flash control;

a defuzzifier operation circuit for obtaining a center of gravity value from a plurality of fitting degrees corresponding to the rules, and obtaining a determination value as an inference result; and electronic flash control means for controlling a light emission enable/disable state of an electronic flash by the determination value from the defuzzifier operation circuit.

18. An electronic flash control apparatus for a camera, comprising:

photometric means for outputting a plurality of object brightness signals including a signal representing a brightness level of at least a central portion of an object;

distance measuring means for outputting distance data of the object;

output means for outputting focal length data of a photographic lens;

a fuzzy operation circuit for receiving outputs from the output means, the photometric means, and the distance measuring means as input value, obtaining a fitting degree of the input values with respect to a then-part membership function from an if-part membership function and the then-part membership function, both of which correspond to a plurality of rules representing a degree of influence of the input value on a light emission angle of an electronic flash;

a defuzzifier operation circuit for obtaining a center of gravity value in correspondence with an output from the fuzzy operation circuit, and obtaining a determination value as an inference result; and electronic flash light emission angle control means for controlling the light emission angle of the electronic flash in accordance with the determination value from the defuzzifier operation circuit.

19. An electronic flash control apparatus for a camera, comprising:

photometric means for outputting a plurality of object brightness signals including a signal representing a brightness level of at least a central portion of an object;

output means for outputting focal length data of a photographic lens;

a fuzzy operation circuit for receiving outputs from the output means and the photometric means as input values, obtaining a fitting degree of the input values with respect to a then-part membership function from an if-part membership function and the then-part membership function, both of which correspond to a plurality of rules representing a degree of influence of the input value on a light emission angle of an electronic flash;

a defuzzifier operation circuit for obtaining a center of gravity value in correspondence with an output of the fuzzy operation circuit, and obtaining a determination value as an inference result; and electronic flash light emission angle control means for controlling the light emission angle of the electronic flash in accordance with the determination value from the defuzzifier operation means.

20. A method for determining photographic conditions to be used in controlling a camera, comprising the steps of:

providing information associated with an object to be photographed;

receiving said information as an input value to a fuzzy operation circuit, obtaining a fitting degree of the input value with respect to a then-part membership function in accordance with an if-part membership function and the then-part membership function, both of which correspond to a plurality of rules representing a degree of influence of the input value on an optimal exposure;

obtaining with a defuzzifier operation circuit a center of gravity value as a result of inference in correspondence with an output from the fuzzy operation circuit; and determining photographic conditions from the determination value from the defuzzifier operation circuit and said information.

21. A method according to claim 20, wherein the if-part membership function is a function in which an axis of abscissa corresponds to said information and an axis of ordinate corresponds to the degree of influence from 0 to 1, and the then-part membership function is a function in which the axis of abscissa corresponds to a correction value, and the axis of ordinate corresponds to the degree of influence from 0 to 1.

22. An exposure value operation method for a camera, comprising the step of:

outputting with a photometric means a plurality of object brightness signals including a signal representing a brightness level of at least a central portion of an object;

receiving an output from the photometric means as an input value to a fuzzy operation circuit, obtaining a fitting degree of the input value with respect to a then-part membership function from an if-part membership function and the then-part membership function, both of which correspond to a plurality of rules representing a degree of influence of the input value on an exposure state;

obtaining with a defuzzifier operation circuit a center of gravity value from a plurality of fitting degrees corresponding to the rules, and obtaining a determination value as an inference result; and determining weighting of the brightness signal from the photometric means to obtain an exposure value in accordance with the determination value from the defuzzifier operation circuit.

23. An exposure value operation method for a camera, comprising the steps of:

outputting with photometric means a plurality of object brightness levels of at least a central portion of an object;

outputting with distance measuring means distance data of the object;

receiving outputs from the distance measuring means and the photometric means as input values to a fuzzy operation circuit, obtaining a fitting degree of the input values with respect to a then-part membership function from an if-part membership function and the then-part membership function, both of which correspond to a plurality of rules representing a degree of influence of the input values on an exposure state;

obtaining with a defuzzifier operation circuit a center of gravity value in correspondence with an output from the fuzzy operation circuit, and obtaining a determination value as an inference result; and determining weighting of the brightness signal from the photometric means to obtain the exposure value in accordance with the determination value from the defuzzifier operation circuit.

24. An electronic flash control method for a camera, comprising the steps of:

outputting with a photometric means a plurality of object brightness signals including a signal representing a brightness level of at least a central portion of an object;

receiving an output from the photometric means as an input value to a fuzzy operation circuit, obtaining a fitting degree of the input value with respect to a then-part membership function from an if-part membership function and the then-part membership function, both of which correspond to a plurality of rules representing a degree of influence of the input value on electronic flash control;

obtaining with a defuzzifier operation circuit a center of gravity value from a plurality of fitting degrees corresponding to the rules, and obtaining a determination value as an inference result; and controlling with an electronic flash control means a light emission enable/disable state of an electronic flash by the determination value from the defuzzifier operation circuit.

25. An electronic flash control method for a camera, comprising the steps of:

outputting with a photometric means a plurality of object brightness signals including a signal representing a brightness level of at least a central portion of an object;

outputting with a distance measuring means distance data of the object;

outputting focal length data of a photographic lens;

receiving outputs from the output means, the photometric means, and the distance measuring means as input values to a fuzzy operation circuit, obtaining a fitting degree of the input values with respect to a then-part membership function from an if-part membership function and the then-part membership function, both of which correspond to a plurality of rules representing a degree of influence of the input value on a light emission angle of an electronic flash;

obtaining with a defuzzifier operation circuit a center of gravity value in correspondence with an output from the fuzzy operation circuit, and obtaining a determination value as an inference result; and controlling with an electronic flash light emission angle control means the light emission angle of the electronic flash in accordance with the determination value from the defuzzifier operation circuit.

26. An electronic flash control method for a camera, comprising the steps of:

outputting with a photometric means a plurality of object brightness signals including a signal representing a brightness level of at least a central portion of an object;

outputting focal length data of a photographic lens;

receiving outputs from the output means and the photometric means as input values to a fuzzy operation circuit, obtaining a fitting degree of the input values with respect to a then-part membership function from an if-part membership function and the then-part membership function, both of which correspond to a plurality of rules representing a degree of influence of the input value on a light emission angle of an electronic flash;

obtaining with a defuzzifier operation circuit a center of gravity value in correspondence with an output of the fuzzy operation circuit, and obtaining a determination value as an inference result; and controlling with an electronic flash emission angle control means the light emission angle of the electronic flash in accordance with the determination value from the defuzzifier operation means.

* * * * *

UNITED STATES PATENT AND TRADEMARK OFFICE
CERTIFICATE OF CORRECTION

REEXAMINATION
PATENT NO. : B1 5,111,232
DATED : November 14, 1995
INVENTOR(S) : Tsunefuji It is certified that error appears in the above-indentified patent and that said Letters Patent is hereby corrected as shown below:

Title page, Item [30]

Under "Foreign Application Priority Data",

"1-1529922" should be --1-152922--

Signed and Sealed this

Fifteenth Day of October, 1996

Attest:

BRUCE LEHMAN

*Attesting Officer*    *Commissioner of Patents and Trademarks*

REEXAMINATION CERTIFICATE (2731th)

United States Patent [19]

Tsunefuji

[11] B1 5,111,232
[45] Certificate Issued Nov. 14, 1995

[54] CAMERA HAVING FUZZY INFERENCE FUNCTION

[75] Inventor: Katsuhiko Tsunefuji, Sagamihara, Japan

[73] Assignee: Olympus Optical Co., Ltd., Tokyo, Japan

Reexamination Request:
No. 90/003,054, May 10, 1993

Reexamination Certificate for:
Patent No.: 5,111,232
Issued: May 5, 1992
Appl. No.: 532,916
Filed: Jun. 4, 1990

[30] Foreign Application Priority Data

Jun. 15, 1989 [JP] Japan .................................. 1-1529922

[51] Int. Cl.$^6$ .................................................. G03B 13/00
[52] U.S. Cl. .................... 354/402; 354/412; 354/145.1
[58] Field of Search ...................... 354/400–409, 354/412, 413, 432, 145.1, 149.1

[56] References Cited

U.S. PATENT DOCUMENTS

| | | | |
|---|---|---|---|
| 4,977,423 | 12/1990 | Yamano et al. | 354/432 |
| 5,121,151 | 6/1992 | Kawabata et al. | 354/402 |

*Primary Examiner*—David M. Gray

[57] ABSTRACT

A camera includes a measuring circuit for outputting data about an object to be photographed. A fuzzy computer receives an output from the measuring circuit as an input value, obtains a fitting degree of the input value with respect to a then-part membership function from an if-part membership function and the then-part membership function, both of which correspond to a plurality of rules representing a degree of influence of the input value on an optimal exposure value, obtains a center of gravity value from a plurality of fitting degrees corresponding to the rules, and obtains a determination value as an inference result. A photographic condition is determined by both the determination value from the fuzzy computer and an output from the measuring circuit.

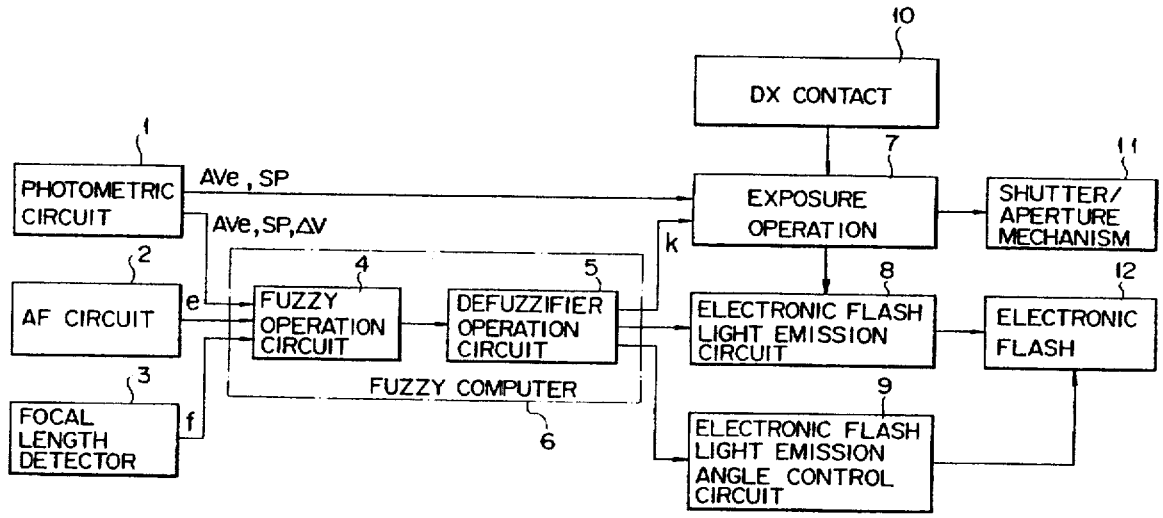

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5–10, 13–20 and 22–26 are determined to be patentable as amended.

Claims 2–4, 11, 12 and 21, dependent on an amended claim, are determined to be patentable.

1. A camera comprising:
   measuring means for outputting information associated with an object to be photographed *including brightness information related to at least a central portion and a peripheral portion of the object*;
   a fuzzy computer *having a non-zero fuzziness* for receiving an output from the measuring means *including the brightness information related to said at least a central portion and a peripheral portion* as an input value, obtaining a fitting degree of the input value with respect to a then-part membership function in accordance with an if-part membership function and the then-part membership function, both of which correspond to a plurality of rules representing a degree of influence of the input value on an optimal exposure, obtaining a center of gravity value from a plurality of fitting [degree] *degrees* corresponding to the rules, and obtaining a determination value as a result of inference; and
   means for determining photographic conditions *including an exposure value* from the determination value *obtained* from the fuzzy computer and the output from said measuring means.

5. An exposure value operation apparatus for a camera, comprising:
   photometric means for outputting a plurality of object brightness signals including a signal representing a brightness level of at least a central portion *and a perpiheral portion* of an object;
   a fuzzy computer *having a non-zero fuzziness* for receiving [an] *the brightness signals related to said at least a central portion and a peripheral portion* output from said photometric means as [an input value] *input values so as to determine an exposure value*, obtaining a fitting degree of the input [value] *values* with respect to a then-part membership function from an if-part membership function and the then-part membership function, both of which correspond to a plurality of rules representing a degree of influence of the input [value] *values* on an exposure state, obtaining a center of gravity value from a plurality of fitting degrees corresponding to the rules, and obtaining a determination value as an inference result; and
   operating means for determining weighting of the brightness signal from said photometric means to obtain [an] *said* exposure value in accordance with the determination value from said fuzzy computer.

6. An exposure value operation apparatus for a camera, comprising:
   photometric means for outputting a plurality of object brightness signals including a signal representing a brightness level of at least a central portion *and a peripheral portion* of an object;
   distance measuring means for outputting distance data of the object;
   a fuzzy computer *having a non-zero fuzziness* for receiving [outputs] *an output* from said distance measuring means and *the brightness signals related to said at least a central portion and a peripheral portion output from said photometric means as input values*, obtaining a fitting degree of the input values with respect to a then-part membership function from an if-part membership function and the then-part membership function, both of which correspond to a plurality of rules representing a degree of influence of the input values on an exposure state, obtaining a center of gravity value from a plurality of fitting degrees corresponding to the rules, and obtaining a determination value as an inference result; and
   operating means for determining weighting of the brightness signal from said photometric means to obtain the exposure value in accordance with the determination value from said fuzzy computer.

7. An electronic flash control apparatus for a camera, comprising:
   photometric means for outputting a plurality of object brightness signals including a signal representing a brightness level of at least a central portion *and a peripheral portion* of an object;
   a fuzzy computer *having a non-zero fuzziness* for receiving [an] *the brightness signals related to said at least a central portion and a peripheral portion* output from said photometric means as [an input value] *input values so as to determine an exposure value*, obtaining a fitting degree of the input [value] *values* with respect to a then-part membership function from an if-part membership function and the then-part membership function, both of which correspond to a plurality of rules representing a degree of influence of the input [value] *values* on electronic flash control, obtaining a center of gravity value from a plurality of fitting degrees corresponding to the rules, and obtaining a determination value as an inference result; and
   electronic flash control means for controlling a light emission enable/disable state of an electronic flash by the determination value from said fuzzy computer.

8. An electronic flash control apparatus for a camera, comprising:
   photometric means for outputting a plurality of object brightness signals including a signal representing a brightness level of at least a central portion of an object;
   distance measuring means for outputting distance data of the object;
   output means for outputting focal length data of a photographic lens;
   a fuzzy computer *having a non-zero fuzziness* for receiving outputs from said output means, said photometric means, and said distance measuring means as input values, obtaining a fitting degree of the input values with respect to a then-part membership function from an if-part membership function and the then-part membership function, both of which correspond to a plurality of rules representing a degree of influence of the input values on a light emission angle of an electronic flash, obtaining a center of gravity value from plurality of fitting degrees corresponding to the rules, and obtaining a determination value as an influence result; and electronic flash light emission angle control means for controlling the light emission angle of said electronic flash in accordance with the determination value from said fuzzy computer.

9. An electronic flash control apparatus for a camera, comprising:

photometric means for outputting a plurality of object brightness signals including a signal representing a brightness level of at least a central part of an object;

output means for outputting focal length data of a photographic lens;

a fuzzy computer *having a non-zero fuzziness* for receiving outputs from said output means and said photometric means as input values, obtaining a fitting degree of the input values with respect to a then-part membership function from an if-part membership function and the then-part membership function, both of which correspond to a plurality of rules representing a degree of influence of the input values on a light emission angle of an electronic flash, obtaining a center of gravity value from a plurality of fitting degrees corresponding to the rules, and obtaining a determination value as an inference result; and electronic flash emission angle control means for controlling the light emission angle of said electronic flash in accordance with the determination value from said fuzzy computer.

10. An exposure determining apparatus for a camera having means for measuring a brightness distribution of an object, comprising:

a fuzzy computer *having a non-zero fuzziness* for obtaining fitness degrees against exposure conditions represented as a plurality of membership functions in accordance with input values corresponding to brightness distribution states of *at least a central portion and a peripheral portion of* an object *to be photographed* and outputting as a determination value an inference result determined by operations for obtaining a center of gravity value from said plurality of fitness degrees *based on said brightness distribution states of the at least a central portion and a peripheral portion of said object*;

control means for determining an exposing condition *such as an exposure value* on the basis of the determination value; and a control target object driven by an output from said control means *for setting an exposure*.

13. A camera comprising:

measuring means for outputting information associated with an object to be photographed *including brightness information related to at least a central portion and a peripheral portion of the object*;

a fuzzy operation circuit *having a non-zero fuzziness* for receiving [an] *the brightness information related to said at least a central portion and a peripheral portion* output from the measuring means as an input value, obtaining a fitting degree of the input value with respect to a then-part membership function in accordance with an if-part membership function and the then-part membership function, both of which correspond to a plurality of rules representing a degree of influence of the input value on an optimal exposure;

a defuzzifier operation circuit for obtaining a determination value as a result of inference in correspondence with a center of gravity value obtained from said fitting degree; and means for determining photographic conditions *including an exposure value* from the determination value *obtained* from the defuzzifier operation circuit and the output from the measuring means.

14. A camera according to claim 13, wherein the if-part membership function is a function in which an axis of abscissa corresponds to the *brightness of the object represented by said* output from the measuring means and an axis of ordinate corresponds to the degree of influence from 0 to 1, and the then-part membership function is a function in which the axis of abscissa corresponds to a correction value, and the axis of ordinate corresponds to the degree of influence from 0 to 1.

15. An exposure value operation apparatus for a camera, comprising:

photometric means for outputting a plurality of object brightness signals including a signal representing a brightness level of at least a central portion *and a perpiheral portion* of an object;

a fuzzy operation circuit [for] *having a non-zero fuzziness* receiving [an] *the brightness signals related to said at least a central portion and a peripheral portion* output from [the] *said* photometric means as [an input value] *input values so as to determine an exposure value*, obtaining a fitting degree of the input [value] *values* with respect to a then-part membership function from an if-part membership function and the then-part membership function, both of which correspond to a plurality of rules representing a degree of influence of the input [value] *values* on an exposure state;

a defuzzifier operation circuit for obtaining a center of gravity value from a plurality of fitting degrees corresponding to the rules, and obtaining a determination value as an inference result; and operating means for determining weighting of the brightness signal from said photometric means to obtain [an] *said* exposure value in accordance with the determination value from the defuzzifier operation circuit.

16. An exposure value operation apparatus for a camera, comprising:

photometric means for outputting a plurality of object brightness [level] *levels* of at least a central portion *and a peripheral portion* of an object;

distance measuring means for outputting distance data of the object;

a fuzzy operation circuit *having a non-zero fuzziness* for receiving an output from the distance measuring means and the *object brightness levels related to said at least a central portion and at least a peripheral portion output from said* photometric means as input values, obtaining a fitting degree of the input values with respect to a then-part membership function from an if-part membership function and the then-part membership function, both of which correspond to a plurality of rules representing a degree of influence of the input values on an exposure state;

a defuzzifier operation circuit for obtaining a center of gravity value in correspondence with an output from the fuzzy operation circuit, and obtaining a determination value as an inference result; and operating means for determining weighting of the brightness signal from said photometric means to obtain an exposure value in accordance with the determination value from the defuzzifier operation circuit.

17. An exposure value operation apparatus for a camera, comprising:

photometric means for outputting a plurality of object brightness signals including a signal representing a brightness level of at least a central portion *and a peripheral portion* of an object;

a fuzzy operation circuit *having a non-zero fuzziness* for receiving [an] *the brightness signals related to said at least a central portion and a peripheral portion* output from the photometric means as [an input value] *input values so as to determine an exposure value*, obtaining a fitting degree of the input [value] *values* with respect to a then-part membership function from an if-part membership function and the then-part membership function, both of which correspond to a plurality of rules representing a degree of influence of the input [value] *values* on electronic flash control;

a defuzzifier operation circuit for obtaining a center of gravity value from a plurality of fitting degrees corresponding to the rules, and obtaining a determination value as an inference result; and electronic flash control means for controlling a light emission enable/disable state of an electronic flash by the determination value from the defuzzifier operation circuit.

18. An electronic flash control apparatus for a camera, comprising:

photometric means for outputting a plurality of object brightness signals including a signal representing a brightness level of at least a central portion of an object;

distance measuring means for outputting distance data of the object;

output means for outputting focal length data of a photographic lens;

a fuzzy operation circuit *having a non-zero fuzziness* for receiving output from the output means, the photometric means, and the distance measuring means as input value, obtaining a fitting degree of the input values with respect to a then-part membership function from an if-part membership function and the then-part membership function, both of which correspond to a plurality of rules representing a degree of influence of the input value on a light emission angle of an electronic flash;

a defuzzifier operation circuit for obtaining a center of gravity value in correspondence with an output from the fuzzy operation circuit, and obtaining a determination value as an inference result; and electronic flash light emission angle control means for controlling the light emission angle of the electronic flash in accordance with the determination value from the defuzzifier operation circuit.

19. An electronic flash control apparatus for a camera, comprising:

photometric means for outputting a plurality of object brightness signals including a signal representing a brightness level of at least a central portion of an object;

output means for outputting focal length data of a photographic lens;

a fuzzy operation circuit *having a non-zero fuzziness* for receiving outputs from the output means and the photometric means as input values, obtaining a fitting degree of the input values with respect to a then-part membership function from an if-part membership function and the then-part membership function, both of which correspond to a plurality of rules representing a degree of influence of the input value on a light emission angle of an electronic flash;

a defuzzifier operation circuit for obtaining a center of gravity value in correspondence with an output of the fuzzy operation circuit, and obtaining a determination value as an inference result; and electronic flash light emission angle control means for controlling the light emission angle of the electronic flash in accordance with the determination value from the defuzzifier operation means.

20. A method for determining photographic conditions *such as an exposure value* to be used in controlling a camera, comprising the steps of:

providing information associated with an object to be photographed *including brightness information about at least a central portion and a peripheral portion of the object*;

receiving said [information as an input value] *brightness information related to said at least a central portion and a peripheral portion as input values* to a fuzzy operation circuit *having a non-zero fuzziness so as to determine an exposure value*, obtaining a fitting degree of the input [value] *values* with respect to a then-part membership function in accordance with an if-part membership function and the then-part membership function, both of which correspond to a plurality of rules representing a degree of influence of the input [value] *values* on an optimal exposure;

obtaining with a defuzzifier operation circuit a center of gravity value as a result of inference in correspondence with an output from the fuzzy operation circuit; and determining photographic conditions *including said exposure value* from the determination value *obtained* from the defuzzifier operation circuit and said information.

22. An exposure value operation method for a camera, comprising the [step] *steps* of:

outputting with a photometric means a plurality of object brightness signals including a signal representing a brightness level of at least a central portion *and a peripheral portion* of an object;

receiving [an] *the brightness signals related to said at least a central portion and a perpiheral portion* output from the photometric means as [an input value] *input values* to a fuzzy operation circuit *having a non-zero fuzziness so as to determine an exposure value*, obtaining a fitting degree of the input [value] *values* with respect to a then-part membership function from an if-part membership function and the then-part membership function, both of which correspond to a plurality of rules representing a degree of influence of the input [value] *values* on an exposure state;

obtaining with a defuzzifier operation circuit a center of gravity value from a plurality of fitting degrees corresponding to the rules, and obtaining a determination value as an inference result; and determining weighting of the brightness signal from the photometric means to obtain [an] *said* exposure value in accordance with the determination value from the defuzzifier operation circuit.

23. An exposure value operation method for a camera, comprising the steps of:

outputting with photometric means a plurality of object brightness levels of at least a central portion *and a peripheral portion* of an object;

outputting with distance measuring means distance data of the object;

receiving [outputs] *an output* from the distance measuring means and the *object brightness levels related to said at least a central portion and at least a peripheral portion output from said* photometric means as input values to a fuzzy operation circuit *having a non-zero fuzziness*, obtaining a fitting degree of the input values with respect to a then-part membership function from an if-part membership function and the then-part membership function, both of which correspond to a plurality of rules representing a degree of influence of the input values on an exposure state;

obtaining with a defuzzifier operation circuit a center of gravity value in correspondence with an output from the fuzzy operation circuit, and obtaining a determination value as an inference result; and determining weighting of the brightness signal from the photometric means to obtain the exposure value in accordance with the determination value from the defuzzifier operation circuit.

24. An electronic flash control method for a camera, comprising the steps of:

outputting with a photometric means a plurality of object brightness signals including a signal representing a brightness level of at least a central portion *and a peripheral portion* of an object;

receiving [an] *the brightness signals related to said at least a central portion and a peripheral portion* output from the photometric means as [an input value] *input values* to a fuzzy operation circuit *having a non-zero fuzziness so as to determine an exposure value*, obtaining a fitting degree of the input [value] *values* with respect to a then-part membership function from an if-part membership function and the then-part membership function, both of which correspond to a plurality of rules representing a degree of influence of the input [value] *values* on electronic flash control;

obtaining with a defuzzifier operation circuit a center of gravity value from a plurality of fitting degrees corresponding to the rules, and obtaining a determination value as an inference result; and controlling with an electronic flash control means a light emission enable/disable state of an electronic flash by the determination value from the defuzzifier operation circuit.

25. An electronic flash control means for a camera, comprising the steps of:

outputting with a photometric means a plurality of object brightness signals including a signal representing a brightness level of at least a central portion of an object;

outputting with a distance measuring means distance data of the object;

outputting focal length data of a photographic lens;

receiving outputs from the output means, the photometric means, and the distance measuring means as input values to a fuzzy operation circuit *having a non-zero fuzziness*, obtaining a fitting degree of the input values with respect to a then-part membership function from an if-part membership function and the then-part membership function, both of which correspond to a plurality of rules representing a degree of influence of the input value on a light emission angle of an electronic flash;

obtaining with a defuzzifier operation circuit a center of gravity value in correspondence with an output from the fuzzy operation circuit, and obtaining a determination value as an inference result; and controlling with an electroinc flash light emission angle control means the light emission angle of the electronic flash in accordance with the determination value from the defuzzifier operation circuit.

26. An electroinc flash control method for a camera, comprising the steps of:

outputting with photometric means a plurality of object brightness signals including a signal representing a brightness level of at least a central portion of an object;

outputting focal length data of a photographic lens;

receiving outputs from the output means and the photometric means as input values to a fuzzy operation circuit *having a non-zero fuzziness*, obtaining a fitting degree of the input values with respect to a then-part membership function from an if-part membership function and the then-part membership function, both of which correspond to a plurality of rules representing a degree of influence of the input value on a light emission angle of an electronic flash;

obtaining with a defuzzifier operation circuit a center of gravity value in correspondence with an output of the fuzzy operation circuit, and obtaining a determination value as an inference result; and controlling with an electronic flash emission angle control means the light emission angle of the electronic flash in accordance with the determination value from the defuzzifier operation means.

* * * * *